US012571628B2

(12) United States Patent
Boucky

(10) Patent No.: US 12,571,628 B2
(45) Date of Patent: Mar. 10, 2026

(54) OPTICAL TEST DEVICE

(71) Applicant: JENOPTIK Industrial Metrology Germany GmbH, Villingen-Schwenningen (DE)

(72) Inventor: Otto Boucky, Nattheim (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 129 days.

(21) Appl. No.: 18/449,609

(22) Filed: Aug. 14, 2023

(65) Prior Publication Data

US 2024/0053144 A1 Feb. 15, 2024

(30) Foreign Application Priority Data

Aug. 15, 2022 (DE) ..................... 10 2022 120 519.3
Sep. 21, 2022 (DE) ..................... 10 2022 124 224.2

(51) Int. Cl.
*G01B 11/30* (2006.01)
(52) U.S. Cl.
CPC .................................. *G01B 11/303* (2013.01)
(58) Field of Classification Search
CPC .... G01B 11/303; G01B 5/0004; G01B 11/24; G01B 11/2522; G01B 21/045; G01B 2210/44
USPC .................................................. 356/601–624
See application file for complete search history.

(56) References Cited

U.S. PATENT DOCUMENTS

| | | | | |
|---|---|---|---|---|
| 9,239,296 | B2 * | 1/2016 | Citriniti | ............... B28B 19/0038 |
| 10,744,675 | B2 * | 8/2020 | Citriniti | ............... C04B 41/5076 |
| 10,895,449 | B2 * | 1/2021 | Nemoto | ................ G01B 11/002 |
| 2010/0045975 | A1 * | 2/2010 | Zoeller, III | ...... G01N 21/95692 |
| | | | | 356/239.2 |
| 2014/0193064 | A1 | 7/2014 | Couse et al. | |
| 2015/0192404 | A1 | 7/2015 | Tang et al. | |
| 2018/0364028 | A1 | 12/2018 | Piel et al. | |
| 2020/0132439 | A1 * | 4/2020 | Nemoto | ............... G01B 11/245 |
| 2021/0050237 | A1 * | 2/2021 | Rebstock | .......... H01L 21/67288 |
| 2021/0096089 | A1 * | 4/2021 | Shimizu | ............... G01N 23/046 |

FOREIGN PATENT DOCUMENTS

| | | | | |
|---|---|---|---|---|
| DE | 102017124978 A1 | 4/2019 | | |
| JP | 4132736 B2 * | 8/2008 | ............. | G01B 21/08 |
| WO | 2013134672 A1 | 9/2013 | | |

(Continued)

OTHER PUBLICATIONS

Deutsches Patent—Und Markenamt, Office Action regarding German Patent Application No. 102022124224.2, dated Sep. 22, 2023, 8 pages.

(Continued)

*Primary Examiner* — Isiaka O Akanbi
(74) *Attorney, Agent, or Firm* — Kolisch Hartwell, P.C.

(57) ABSTRACT

An optical test device for testing flat test objects comprises a holder for the test object and two optical sensors for detecting the three-dimensional surface topography of the test object. According to the invention, the holder is formed at least in sections as a test standard and is disposed with respect to the sensors in such a way that the sensors scan the test object from opposite sides and also detect the holder as a test standard at least in sections during the detecting of the test object.

18 Claims, 2 Drawing Sheets

(56) References Cited

FOREIGN PATENT DOCUMENTS

| WO | 2013182960 | A1 | 12/2013 |
| WO | 2019205499 | A1 | 10/2019 |

OTHER PUBLICATIONS

European Patent Office, Extended European Search Report regarding European Patent Application No. 23190875.7, dated Dec. 21, 2023, 11 pages.

\* cited by examiner

OPTICAL TEST DEVICE

CROSS-REFERENCES

This application claims the benefit under 35 U.S.C. § 119(a) of the priority of German Patent Application No. 10 2022 120 519.3, filed Aug. 15, 2022, and German Patent Application No. 10 2022 124 224.2, filed Sep. 21, 2022, the entirety of which are hereby incorporated by reference for all purposes.

BACKGROUND

The invention relates to an optical test device for testing flat test objects.

When inspecting flat test objects, the test object is often only detected and measured from one side via an optical test equipment. For this purpose, profile projectors can be used, for example, which detect the test object in its bilateral shape and position. Distortions caused by the manufacturing process of the test object are only of minor importance here.

If the test object has a precise and tightly toleranced surface topography that is to be detected via a 3D measuring system, distortions of the test object play a major role. To hold the test object in a measuring plane during the test, holders working magnetically or with vacuum technology can be used. After detecting or measuring one side of the test object, it must be reclamped for detecting or measuring the other side. This costs time and leads to a significant worsening of the measurement accuracy.

DE 10 2015 205 461 A1 discloses a correction device for an optical measuring device, in which a light-transmitting scale is disposed in the path of the measuring beam.

SUMMARY

The object of the invention is to provide an optical test device for testing flat test objects, which enables fast and reliable testing with high measuring accuracy.

This problem is solved by the invention specified in claim 1.

The invention provides an optical test device for testing flat test objects, which comprises a holder for the test object. The test device comprises, according to the invention, two optical sensors for detecting the three-dimensional surface topography of the test object. According to the invention, the holder is formed at least in sections as test standard and is disposed relative to the sensors in such a way that the sensors scan the test object from opposite sides and, when detecting the test object, also detect the holder as test standard at least in sections.

The basic thought of the invention is to geometrically detect the front and rear side of a flat test object in a common measuring process and to form the holder at least in sections as test standard, which is also detected during the detecting of the surfaces of the component. The geometry of the test standard is precisely determined or pre-known, so that the geometry of the test standard detected during the measurement forms a reference for the measurement.

Through the reference provided by the test standard, on the one hand, the measurement values of the sensors representing opposite sides of the test object can be brought into relation to each other.

On the other hand, alignment errors of the sensors relative to each other can be compensated.

For example, and in particular, the holder can be formed like a frame with a windowshaped recess and comprise a support structure, for example in form of projections spaced apart from each other along the circumference of the recess, on which the test object is arranged.

During the test, the three-dimensional topography of the surface of the test object is detected by detecting via the optical sensors from both sides of the test object. According to the invention, the surface of the holder acting as test standard is also detected at least in sections, so that the position of the test object in three-dimensional space is detected unambiguously. A prior mechanical or computational alignment of the test object is thus not necessary.

In this way, the test of corresponding test objects is simplified and the measurement accuracy is increased when determining the three-dimensional topography of the surface of the test object.

A particular advantage of the invention is that both sides of the test object are detected simultaneously and the position of the test object is not changed during the testing process. This significantly increases the test speed and avoids measurement inaccuracies that can occur when the position of the test object has to be changed during the test, for example by reclamping.

By designing and using the holder for the test object, which is present anyway, as test standard, a relatively simple construction of the test device results from the invention.

An advantageous further development of the invention provides that the holder is formed as a frame. The test object held in the frame is optically accessible from both sides and can thus be scanned via the sensors.

The design of the frame is selectable within wide limits according to the respective requirements and conditions. An advantageous further development provides that the frame is formed as a circumferentially closed frame with a window-shaped recess. In this embodiment, the circumferentially closed frame ensures a high mechanical stability of the holder, wherein the both-sided surfaces of the test object are optically accessible through the recess and can be scanned via the sensors.

Another advantageous further development of the invention provides that the frame comprises a support structure, on which the test object can be loosely arranged. In this embodiment, the test object is arranged loosely on the support structure of the holder in a particularly simple manner.

The support structure can be formed in a variety of ways according to the respective requirements and conditions and can, for example, consist of a transparent material. For example, the support structure can also be formed like a thread and stretch over the recess in the holder.

A further development of the invention provides that the support structure comprises projections spaced apart from each other in the circumferential direction of the frame. In this respect, it is sufficient and desirable in the sense of a static certainty, that three projections spaced apart from each other in the circumferential direction of the frame or the recess in the frame are provided.

According to the respective requirements and conditions, the holder can be designed in a variety of ways. In the sense of a particularly simple construction, an advantageous further development provides that the holder is formed as plane-parallel plate. The plate is adapted to the respective test object or a family of test objects with regard to its thickness and size of the recess. The material of the plate can be chosen according to the respective application, for example aluminium for measuring tasks with relatively low accuracy and Zerodur for measuring tasks with high accuracy.

Another advantageous further development of the invention provides that the holder is coated at least in sections. By means of the coating, a desired or required surface property in the sense of the optical sensors used can be produced in surface areas of the holder, which function as test standard surfaces of the test standard. However, this can also be done by mechanical processing methods.

Corresponding to the respective requirements and conditions, different optical sensors can be used, wherein the selection of the sensors can be made, for example, in dependency of the surface property of the test object, its aspect ratio, the required cycle time and the tolerances of the test object. With regard to the design of the sensors, an advantageous further development of the invention provides that at least one optical sensor is formed and configured for planar detecting of the test object. Due to the planar detecting of the test object, a relative movement between the holder and the sensors is not necessary during the test procedure. For the planar detecting of the test object, planar white light sensors or holographic sensors can be used, for example.

Another advantageous further development of the invention with regard to the selection of the sensors provides that at least one optical sensor is formed and configured for linear detecting of the test object, wherein a feeding device is provided for the relative movement of the holder relative to the sensors in such a way that during the feeding the test object is scanned via the sensors. Laser triangulation sensors or photogrammetric sensors, for example, can be used as corresponding sensors.

Furthermore, suitable optical sensors are generally known to the skilled person and are therefore not explained in detail here.

For simultaneous detecting of both sides of the test object during the test, two sensors are basically sufficient according to the invention, each of which is assigned to one side of the test object. However, corresponding to the respective requirements and conditions, two or more sensors can also be assigned to each side of the test object.

Insofar as both sides of the test object have the same or similar surface properties and accordingly there is an identical or similar measuring task with respect to the sensors, the sensors of the test device according to the invention can be identical in construction. However, in the case of test objects with different surface properties on the two sides, different sensors can also be used.

An extraordinarily advantageous further development of the invention provides that the holder comprises two preferably plateshaped individual parts, each with a window-shaped recess for receiving the test object in a reference plane, which are formed as test standard surfaces on their mutually facing surfaces, wherein the individual parts are connected to one another in the reference plane offset relative to one another in such a way that in each case test standard surfaces of one of the individual parts can be scanned or touched by one of the sensors via the recess in the other individual part. In this embodiment, it is sufficient to only fine-machine the contact surfaces of the individual parts of the holder to a very flat surface. At the same time, the measuring accuracy is increased by reducing the influence of deviations in the geometry of the test standard on the measuring result.

Another advantageous further development of the test device according to the invention provides that the holder is provided on at least one test standard surface with surface characteristics detectable via the sensors. The corresponding surface characteristics can, for example, form a scale by means of which the feed movement of a feeding device can be precisely detected. However, a corresponding scale can also be used to detect imperfections of the sensors used and to take them into account when evaluating the test result.

In claim 12, a method for testing flat test objects according to the invention is specified, in which a test device according to the invention is used.

In particular, the test object can be a bipolar plate of a fuel cell or a battery foil, as provided by advantageous further developments of the method according to the invention.

DETAILED DESCRIPTION

Figure 1:
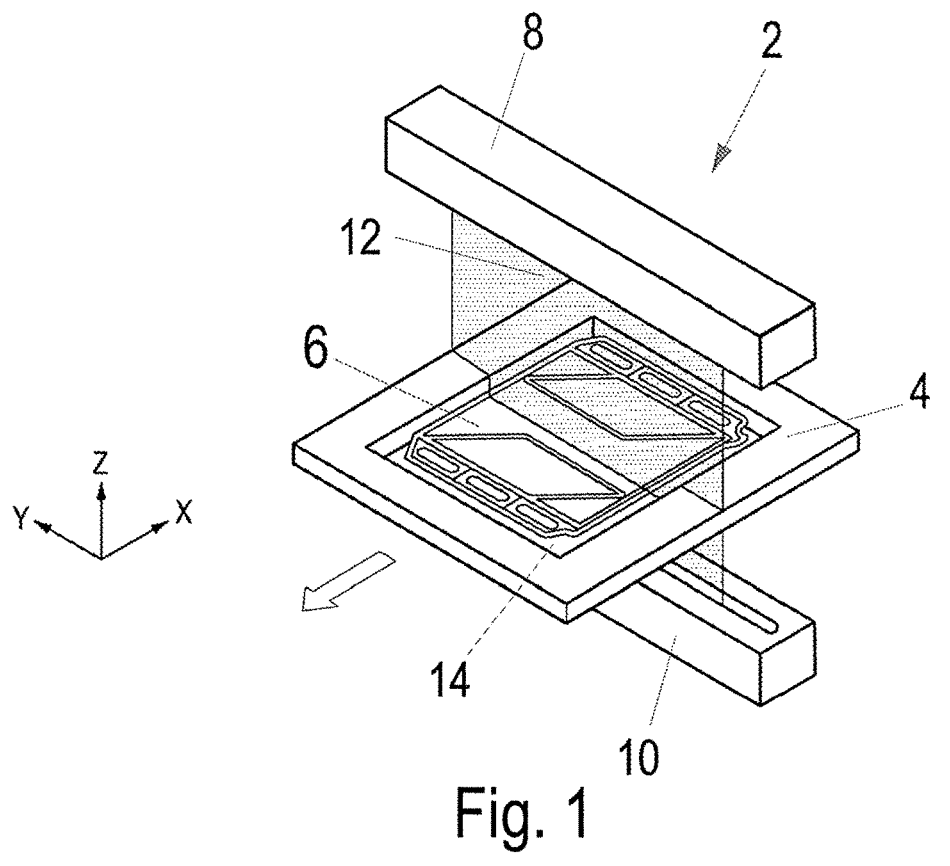
FIG. 1 is a highly schematised perspective view of a first embodiment of an optical test device according to the invention.

The invention is described in more detail below with reference to the attached, highly schematised drawing using examples of embodiments. It is apparent to the skilled person that the individual features of an embodiment example further develop the embodiment example in each case on its own, i.e. independently of the further features. Thus, it is also apparent to the skilled person that all the features described, shown in the drawing and claimed in the claims, taken individually and in any technically useful combination with each other, form the subject matter of the invention, irrespective of their summarisation in the patent claims and their references and irrespective of their specific description or representation in the drawing. The subject matter and disclosure of the present application also include combinations of features of the device claims with features of the process claims. The subject matter and disclosure of the present application also include combinations of features of one embodiment with features of another embodiment. The subject matter and disclosure of the present application also include sub-combinations of the claims, in which at least one feature of a claim is omitted or replaced by another feature.

In the following, examples of embodiments of a test device according to the invention are explained in more detail with reference to FIGS. 1 to 4.

FIG. 1 shows a first embodiment of an optical test device 2 according to the invention for testing flat test objects, which comprises a holder 4 for a test object 6, which in this embodiment is formed by a bipolar plate of a fuel cell.

The test device 2 comprises, according to the invention, two optical sensors 8, 10 for detecting the three-dimensional surface topography of the test object 6. The sensors 8, 10 are disposed facing each other with respect to their measuring direction, so that they scan the test object 6 from its two opposite sides.

According to the invention, the holder 4 is formed at least in sections as test standard and is disposed relative to the sensors 8, 10 in such a way that the sensors 8, 10 scan the test object 6 from opposite sides and the holder 4 is also detected as test standard during the detecting of the test object 6.

In the embodiment shown, the holder 4 consists of a plane-parallel plate and is formed as frame 12. As can be seen from FIG. 1, in the embodiment shown the frame is formed as a frame closed in the circumferential direction with a central windowshaped recess 14. The frame 14 comprises a support structure at its recess, on which the test object 6 is loosely arranged. The support structure may comprise projections spaced apart from each other in the circumferential direction of the frame, for example.

As can be seen from FIG. 1, the arrangement of the holder 4 and the sensors 8, 10 relative to each other is such that when the test object 6 is detected via the sensors 8, 10, the frame 12 is also detected at least in sections. By also detecting the frame as test standard, the position of the test object 6 in space is clearly defined, so that the measurement values of the sensors 8, 10 can be related to each other without the need for prior mechanical or computational alignment of the test object.

In the embodiment shown, the sensors 8, 10 are formed identically and are formed and configured for linear detecting of the test object. To scan the test object 6, the holder 4 is moved in X-direction by a feeding device. The construction of a corresponding feeding device is generally known to the skilled person and is therefore not explained in detail here. The feeding device is also not shown in the drawing to simplify the illustration.

Suitable sensors are generally known to the skilled person and are therefore not explained in detail here.

The holder 4 is finely machined at least in the portions, which are also detected during the detecting of the surface of the test object 6 and thus form test standard surfaces, so that the geometry of the holder is precisely determined and known in advance at least in these portions, so that the holder 4 functions as test standard or measuring standard according to the invention.

The measurement values obtained during the scanning of the test object 6 via the sensors 8, 10 are evaluated by an evaluation device in data transmission connection with the sensors 8, 10, so that the actual geometry of the test object 6 is available as test result or measurement result at the end of the test procedure.

Since, according to the invention, a geometrical test of the test object is possible without prior mechanical or computational alignment, the test of test objects is made quick and easy.

Since it is not necessary to change the position of the test object 6 in order to test both sides of the test object 6, measurement uncertainties are avoided and measurement accuracy is improved.

Figure 2:
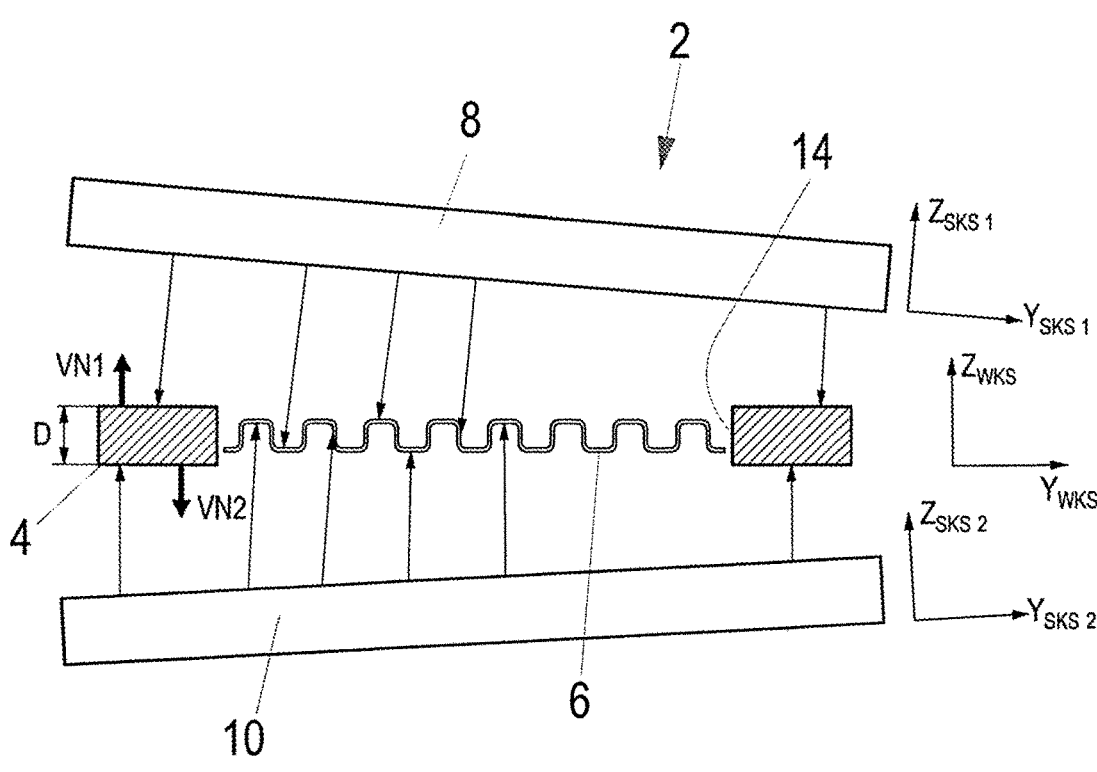
FIG. 2 is a schematised side view of the test device according to FIG. 1 during a test procedure.

FIG. 2 shows a side view of the embodiment according to FIG. 1, wherein the measuring or scanning direction of the sensors 8, 10 is ideally perpendicular to a measuring plane, in which the test object 6 is held on the holder 4. In FIG. 1, an alignment error of sensor 8 is indicated by tilting opposite to the measuring plane.

The alignment error can be corrected after the measurement as follows:

The sensor 8 detects measurement values of the surface of the upper side of the test object 6 in a first sensor coordinate system SKS1. A plane is calculated in the evaluation device from the measurement values of the upper side of the holder 4 as test standard and a coordinate transformation of the measurement values of the surface of the test object 6 is carried out with the normal vector of this plane. By evaluating previously selected characteristics of the top surface, for example an edge, the plane in the first sensor coordinate system SKS1 is rotated around the normal vector VN 1 into the coordinate system of the test object 6 (workpiece coordinate system WKS). Thus the measurement values of the upper side of the test object 6 are available in the workpiece coordinate system.

In corresponding manner, the sensor 10 detects measurement values of the surface of the underside of the holder 4, from which a plane is calculated and with the normal vector of this plane a coordinate transformation of the measurement values of the surface of the test object 6 is carried out. In a manner corresponding to the sensor 8, a plane is calculated by selecting previously selected characteristics of the underside, for example an edge, and the plane of the sensor coordinate system SKS2 is rotated into the workpiece coordinate system WKS around the normal vector of this plane. The measurement values can then be transformed into the workpiece coordinate system.

In conclusion, the top and bottom sides of the test object 6 are detected in a common coordinate system and can thus be subjected to further evaluation.

Alternatively, a correction can be carried out during the measurement in the Y/Z plane. In this case, a direct reference to the reference plane is constructed for each measurement line xi, so that path inaccuracies in Z direction are thus compensated during the movement in X direction. A deviation of the path in Y-direction can be determined by evaluating, for example, an edge of the holder 4 and compensated for correspondingly.

If necessary or desired, the data obtained via the sensors 8, 10 can be subjected as images of an image processing, for example, to perform an artefact detection in a grey image.

Figure 3:
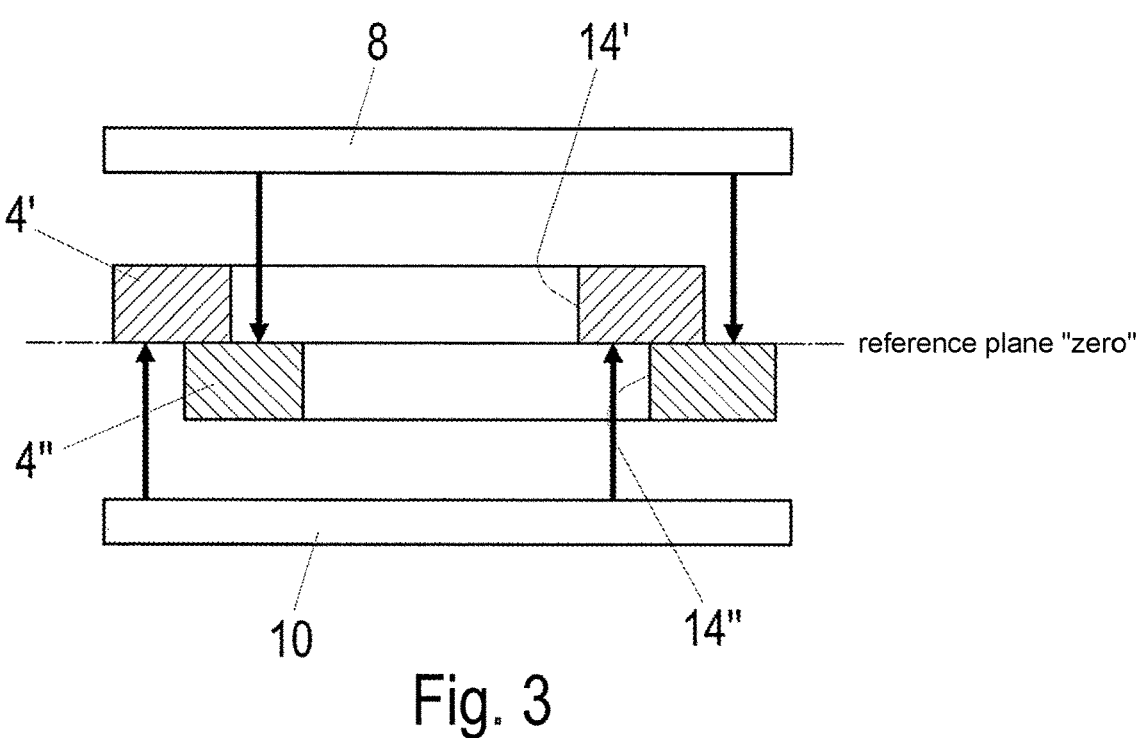
FIG. 3 is a schematised side view of a holder of a second embodiment of a test device according to the invention.

FIG. 3 shows a second embodiment example of a test device 2 according to the invention, which differs from the first embodiment example in the design of the holder 4.

In the second embodiment example, the holder 4 comprises two plateshaped rectangular individual parts 4', 4" formed as identical parts, each with a windowshaped rectangular recess 14,' 14" for receiving the test object 6 in a reference plane, which are formed as test standard surfaces on their mutually facing surfaces. The individual parts 4', 4" are connected to each other in the reference plane offset from each other in such a way that test normal surfaces of one individual part 4' or 4" are scannable or scanned by one of the sensors 8, 10 via the recess 14" or 14" in the other individual part 4" or 4".

Figure 4:
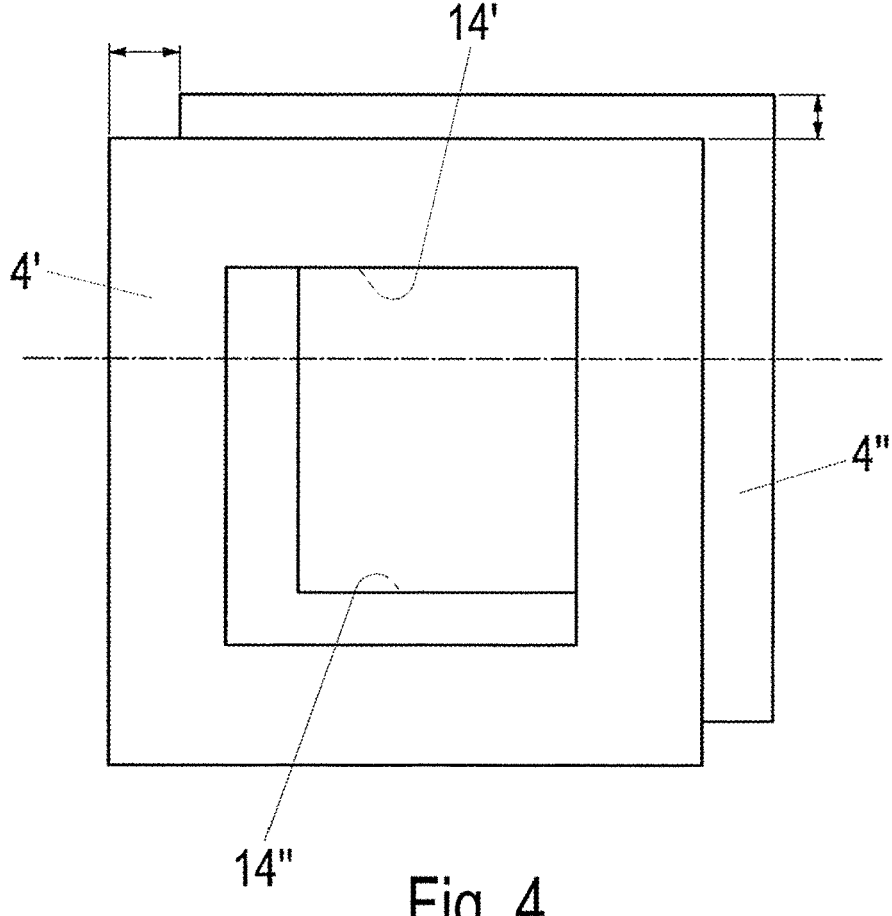
FIG. 4 is a top view of the holder according to FIG. 3.

As can be seen in FIG. 4, the offset of the individual parts 14', 14" and the design of the contact surfaces between the individual parts 14', 14" as test standard surfaces 2 result in surfaces that are visible from both sides (upper side and lower side) and can be scanned or detected via the sensors 8, 10. Both surfaces lie in one plane and thus define a zero plane, so that measurement errors due to parallelism tolerances and thickness variations of the holder 4 are avoided. This reliably prevents deviations of the geometry of the holder 4 as test standard from the specified or desired geometry from entering into the measurement result.

Illustrative Combinations and Additional Examples

This section describes additional aspects and features of the invention, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An optical test device (2) for testing flat test objects (6), with a holder (4) for the test object (6) and with at least two optical sensors (8, 10) for detecting the three-dimensional surface topography of the test object (6), wherein the holder (4) is formed at least in sections as test standard and is disposed relative to the sensors (8, 10) in such a way that the sensors (8, 10) scan the test object (4) from opposite sides and, during the detecting of the test object (6), also detect the holder (4) as test standard at least in sections.

A1. The test device according to paragraph A0, wherein the holder (4) is formed as a frame (12).

A2. The test device according to paragraph A1, wherein the frame (12) is formed as a circumferentially closed frame with a window-shaped recess.

A3. The test device according to paragraph A1 or A2, wherein the frame (12) comprises a support structure, onto which the test object (6) can be loosely arranged.

A4. The test device according to paragraph A3, wherein the support structure comprises projections spaced apart from each other in circumferential direction of the frame (12).

A5. The test device according to one of the preceding paragraphs, wherein the holder (4) is formed as plane-parallel plate.

A6. The test device according to one of the preceding paragraphs, wherein the holder is at least (4) coated in sections.

A7. The test device according to one of the preceding paragraphs, wherein at least one optical sensor (8, 10) is formed and configured for planar detecting of the test object (6).

A8. The test device according to one of paragraphs 1 to 7, wherein at least one optical sensor (8, 10) is formed and configured for linear detecting of the test object (6), wherein a feeding device is provided for the relative movement of the holder (4) relative to the sensors (8, 10), such that during the feeding the test object (6) is scanned by the sensor.

A9. The test device according to one of the preceding paragraphs, wherein the holder (4) comprises two preferably plate-shaped individual parts (4', 4"), each with a window-shaped recess (14', 14") for the receiving of the test object (6) in a reference plane, which are formed as test standard surfaces at their mutually facing surfaces, wherein the individual parts (4', 4") are connected to each other in the reference plane offset relative to each other in such a way that test normal surfaces of the one individual part (4' or 4") can be or are scanned by one of the sensors (8, 10) through the recess (14" or 14') in the other individual part (14", 14').

A10. The test device according to one of the preceding paragraphs, wherein the holder (6) is provided at at least one test standard surface with surface characteristics detectable by at least one sensor (8, 10).

A11. A method for testing flat test objects, wherein a test device according to one of the preceding paragraphs is used.

A12. The method according to paragraph A11, wherein the test object is a bipolar plate of a fuel cell.

A13. The method according to paragraph A11, wherein the test object is a battery foil.

What is claimed is:

1. An optical test device for testing flat test objects, comprising:

a holder for the test object and at least two optical sensors for detecting the three-dimensional surface topography of the test object, wherein:

the holder is formed at least in sections as test standard and is disposed relative to the sensors in such a way that the sensors scan the test object from opposite sides and, during the detecting of the test object, also detect the holder as test standard at least in sections, the holder comprises two plate-shaped individual parts, each with a window-shaped recess for the receiving of the test object in a reference plane, which are formed as test standard surfaces at their mutually facing surfaces, and the individual parts are connected to each other in the reference plane offset relative to each other in such a way that test normal surfaces of the one individual part can be or are scanned by one of the sensors through the recess in the other individual part.

2. The test device according to claim 1, wherein the holder is formed as a frame.

3. The test device according to claim 2, wherein the frame is formed as a circumferentially closed frame with a window-shaped recess.

4. The test device according to claim 2, wherein the frame comprises a support structure, onto which the test object can be loosely arranged.

5. The test device according to claim 4, wherein the support structure comprises projections spaced apart from each other in circumferential direction of the frame.

6. The test device according to claim 1, wherein the holder is formed as a frame which comprises a support structure, onto which the test object can be loosely arranged, the frame is formed as a circumferentially closed frame with a window-shaped recess, and the support structure comprises projections spaced apart from each other in circumferential direction of the frame.

7. The test device according to claim 6, wherein the holder is at least coated in sections.

8. The test device according to claim 1, wherein the holder is formed as plane-parallel plate.

9. The test device according to claim 8, wherein at least one optical sensor is formed and configured for planar detecting of the test object.

10. The test device according to claim 1, wherein the holder is at least coated in sections.

11. The test device according to claim 1, wherein at least one optical sensor is formed and configured for planar detecting of the test object.

12. The test device according to claim 1, wherein at least one optical sensor is formed and configured for linear detecting of the test object, wherein a feeding device is provided for the relative movement of the holder relative to the sensors, such that during the feeding the test object is scanned by the sensor.

13. The test device according to claim 12, wherein the holder is provided at at least one test standard surface with surface characteristics detectable by at least one sensor.

14. The test device according to claim 13, wherein the holder is at least coated in sections.

15. The test device according to claim 1, wherein the holder is provided at at least one test standard surface with surface characteristics detectable by at least one sensor.

16. A method for testing flat test objects, wherein a test device according to claim 1 is used.

17. The method according to claim 16, wherein the test object is a bipolar plate of a fuel cell.

18. The method according to claim 16, wherein the test object is a battery foil.

\* \* \* \* \*